(12) United States Patent
Fukui et al.

(10) Patent No.: US 12,381,237 B2
(45) Date of Patent: Aug. 5, 2025

(54) FUEL CELL STACK

(71) Applicant: HONDA MOTOR CO., LTD., Tokyo (JP)

(72) Inventors: Yoichi Fukui, Wako (JP); Naoki Inoue, Wako (JP); Yuta Ikeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 675 days.

(21) Appl. No.: 17/681,808

(22) Filed: Feb. 27, 2022

(65) Prior Publication Data

US 2022/0302480 A1 Sep. 22, 2022

(30) Foreign Application Priority Data

Mar. 19, 2021 (JP) ................. 2021-045356

(51) Int. Cl.
*H01M 8/04082* (2016.01)
*H01M 8/1004* (2016.01)
*H01M 8/2475* (2016.01)
*H01M 8/2483* (2016.01)

(52) U.S. Cl.
CPC ..... *H01M 8/04201* (2013.01); *H01M 8/1004* (2013.01); *H01M 8/2475* (2013.01); *H01M 8/2483* (2016.02); *H01M 2250/20* (2013.01)

(58) Field of Classification Search
CPC ........... H01M 8/04201; H01M 8/2483; H01M 8/1004; H01M 8/2475; H01M 2250/20
See application file for complete search history.

(56) References Cited

U.S. PATENT DOCUMENTS

| | | | |
|---|---|---|---|
| 7,588,851 B2 | 9/2009 | Asai et al. | |
| 2003/0124407 A1* | 7/2003 | Tanaka | H01M 8/2457 429/413 |
| 2018/0166728 A1 | 6/2018 | Hayashi et al. | |
| 2018/0277878 A1* | 9/2018 | Kanno | H01M 8/0258 |
| 2019/0305339 A1* | 10/2019 | Ikeda | H01M 8/04201 |
| 2020/0144655 A1 | 5/2020 | Takeyama et al. | |

FOREIGN PATENT DOCUMENTS

| | | |
|---|---|---|
| CN | 108232239 A | 6/2018 |
| CN | 110336064 A | 10/2019 |
| JP | 2003-338305 A | 11/2003 |

(Continued)

OTHER PUBLICATIONS

Machine Translation of Saito JP_3589221_B2 published Nov. 17, 2004 (Year: 2004).*

(Continued)

*Primary Examiner* — Jonathan G Leong
*Assistant Examiner* — Everett T Choi
(74) *Attorney, Agent, or Firm* — Carrier, Shende & Associated, P.C.; Joseph P. Carrier; Jeffrey T. Gedeon (57) ABSTRACT

In the fuel-cell stack, a bypass channel is formed between the first insulating plate and the second insulating plate. The bypass channel connects the second plate passage to the lower oxygen-containing gas discharge passage. An annular protrusion protruding toward the second plate passage is provided around the first plate passage. A lower part of an inner surface forming the first plate passage has an inclined section that is inclined upward toward the downstream of the reaction gas.

4 Claims, 6 Drawing Sheets

(56) References Cited

FOREIGN PATENT DOCUMENTS

| | | | |
|---|---|---|---|
| JP | 3589221 | B2 * | 11/2004 |
| JP | 2014-175115 | A | 9/2014 |
| JP | 2019-175673 | A | 10/2019 |

OTHER PUBLICATIONS

Office Action dated Nov. 15, 2022 issued over the corresponding Japanese Patent Application No. 2021-045356 with the English translation thereof.
Office Action dated Jan. 8, 2025 issued in the corresponding Chinese Patent Application No. 202210183634.X with the English machine translation thereof.

* cited by examiner

FUEL CELL STACK

CROSS-REFERENCE TO RELATED APPLICATIONS

This application is based upon and claims the benefit of priority from Japanese Patent Application No. 2021-045356 filed on Mar. 19, 2021, the contents of which are incorporated herein by reference.

BACKGROUND OF THE INVENTION

Field of the Invention

The present invention relates to a fuel cell stack.

Description of the Related Art

In general, a solid polymer electrolyte fuel cell employs a solid polymer electrolyte membrane made of a polymer ion exchange membrane. The fuel cell includes a membrane electrode assembly (MEA). The membrane electrode assembly includes the solid polymer electrolyte membrane, an anode provided on one surface of the solid polymer electrolyte membrane, and a cathode provided on the other surface of the solid polymer electrolyte membrane.

The membrane electrode assembly is sandwiched between the separators to form a power generation cell. A predetermined number of the power generation cells are stacked one another to form a cell stack body. A terminal plate, an insulating plate, and an end plate are disposed at each of both ends of the cell stack body to form a fuel cell stack. At each of both ends, the terminal plate, the insulating plate and the end plate are arranged in this order in a direction away from the cell stack body. The fuel cell stack is mounted on a vehicle, for example, and supplies electric power to a traveling drive source of the vehicle.

In this type of fuel cell stack, a fuel gas flow field (reactant gas flow field) is formed between the anode and one of the separators. An oxygen-containing gas flow field (reactant gas flow path) is formed between the cathode and the other of the separators. Each of the cell stack body, the insulating plate, and the end plate has a fuel gas supply passage (reactant gas supply passage) through which a fuel gas is supplied to the fuel gas flow field, a fuel gas discharge passage through which the fuel gas is discharged, an oxygen-containing gas supply passage (reactant gas supply passage) through which an oxygen-containing gas is supplied to the oxygen-containing gas flow field, and an oxygen-containing gas discharge passage through which the oxygen-containing gas is discharged.

JP 2019-175673 A discloses a fuel cell stack as described below. In this fuel cell stack, in the case where there are a plurality of reaction gas discharge passages, it is possible to prevent liquid water such as dew condensation water from being retained in the vicinity of the reaction gas supply passage and entering the power generation cells. In this fuel cell stack, a bypass channel for drainage having an inlet on the upstream side of the reaction gas supply passage of the power generation cells is provided. An annular protrusion protruding toward the upstream side in the gas flow direction is provided in the vicinity of the inlet of the bypass channel.

SUMMARY OF THE INVENTION

An object of the present invention is to more effectively suppress intrusion of liquid water into power generation cells in a fuel cell stack having a bypass channel and an annular protrusion.

According to an aspect of the present invention, a fuel cell stack including a cell stack body, and a terminal plate, a first insulating plate, a second insulating plate and an end plate which are disposed at one end of the cell stack body, the cell stack body including a plurality of power generation cells stacked one another, each of the power generation cells including a membrane electrode assembly and separators with the membrane electrode assembly interposed between the separators, the membrane electrode assembly including an electrolyte membrane, an anode and a cathode, with the electrolyte membrane interposed between the anode and the cathode, wherein the first insulating plate is arranged between the cell stack body and the second insulating plate, a reactant gas supply passage for supplying a reactant gas to the anode or the cathode, an upper reactant gas discharge passage and a lower reactant discharge passage both for discharging a remainder of the reactant gas having been consumed at the anode or the cathode extend in a stacking direction through at least the cell stack body, the first insulating plate, the second insulating plate and the end plate, the reactant gas supply passage is disposed at one end of the cell stack body in a horizontal direction, and the upper reactant gas discharge passage is disposed at another end of the cell stack body in the horizontal direction at a position higher than the reactant gas supply passage, and the lower reactant gas discharge passage is disposed at the another end of the cell stack body in the horizontal direction at a position lower than the reactant gas supply passage, the reactant gas supply passage in the first insulating plate is a first plate passage and the reactant gas supply passage in the second insulating plate is a second plate passage, a bypass channel is formed between the first insulating plate and the second insulating plate and connects the second plate passage to the lower reactant gas discharge passage, an annular protrusion protruding toward the second plate passage is disposed around the first plate passage, the annular protrusion forms an inlet of the bypass channel with the second insulating plate, the annular protrusion includes an internal space defining a part of the first plate passage, and a lower portion of an inner surface of the first plate passage includes an inclined section that is inclined upward toward a downstream of the reactant gas.

According to the present invention, in the fuel cell stack having the bypass channel and the annular protrusion, it is possible to more effectively suppress intrusion of liquid water into the power generation cells.

The above and other objects, features and advantages of the present invention will become more apparent from the following description when taken in conjunction with the accompanying drawings in which a preferred embodiment of the present invention is shown by way of illustrative example.

DESCRIPTION OF THE INVENTION

Figure 1:
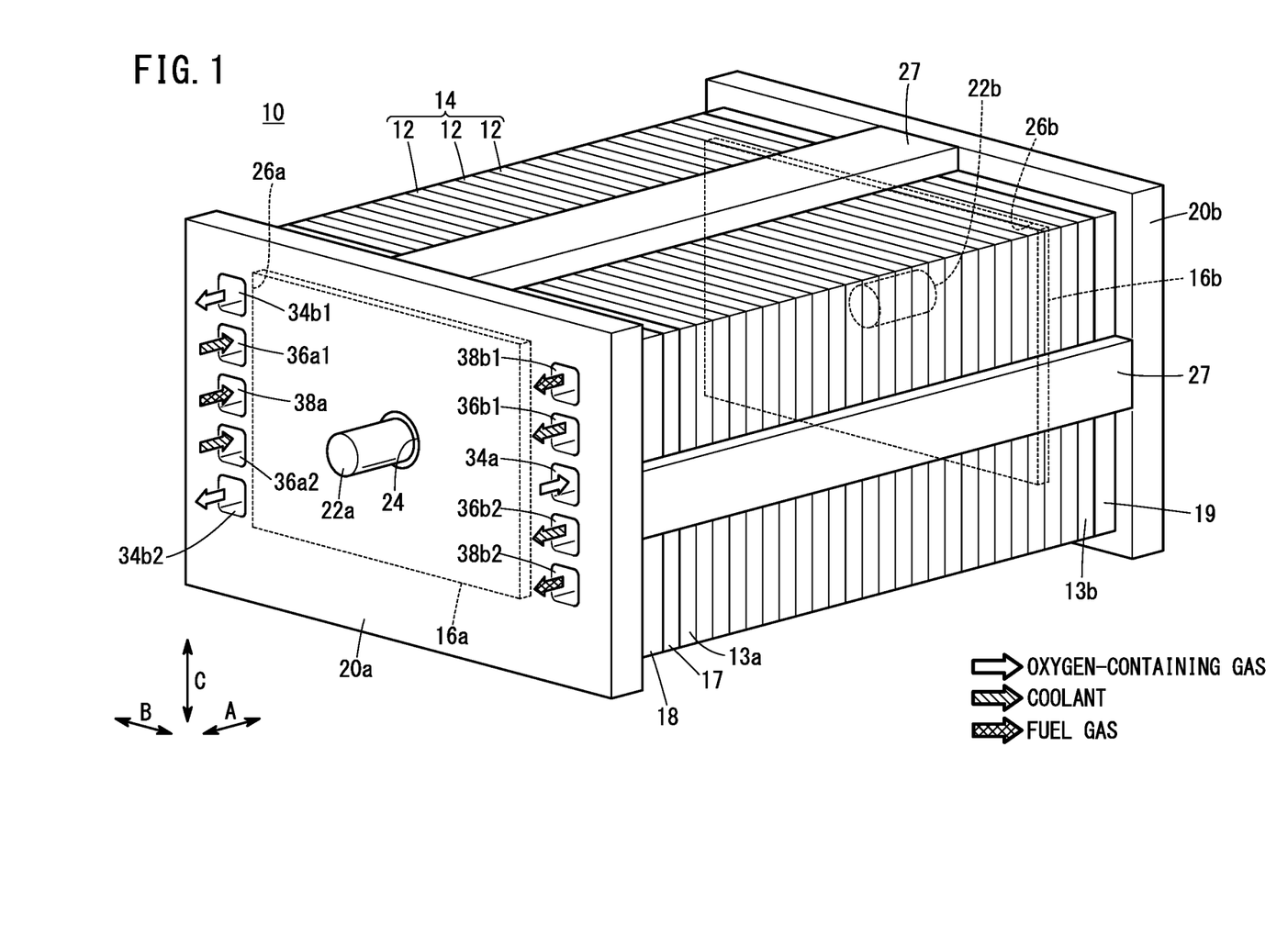
FIG. 1 is an entire schematic perspective view of a fuel cell stack according to an embodiment of the present invention.

FIG. 1 is an entire schematic perspective view of a fuel cell stack 10 according to the present embodiment. The fuel cell stack 10 includes a cell stack body 14 in which a plurality of power generation cells 12 are stacked in a horizontal direction (the arrow A direction). The fuel cell stack 10, for example, is mounted in a fuel cell vehicle such as a fuel cell electric automobile (not shown). Note that the arrow B direction is a horizontal direction perpendicular to the arrow A direction, and the arrow C direction is a vertical direction.

A dummy cell 13a, a terminal plate 16a, a first insulating plate 17, a second insulating plate 18, and an end plate 20a are disposed in this order outward in the stacking direction at one end of the cell stack body 14 in the stacking direction (the direction of the arrow A). The dummy cell 13a is disposed (sandwiched) between the cell stack body 14 and the first insulating plate 17. The terminal plate 16a is a plate for collecting electric power. The first insulating plate 17 is disposed (sandwiched) between the cell stack body 14 and the second insulating plate 18. The second insulating plate 18 is disposed (sandwiched) between the first insulating plate 17 and the end plate 20a. A plurality of dummy cells 13a may be arranged.

A dummy cell 13b, a terminal plate 16b, an insulating plate 19, and an end plate 20b are disposed in the stacking direction in this order outward in the stacking direction at the other end of the cell stack body 14 in the stacking direction. The dummy cell 13b is disposed (sandwiched) between the cell stack body 14 and the insulating plate 19. The insulating plate 19 is disposed (sandwiched) between the dummy cell 13b and the end plate 20b. A plurality of dummy cells 13b may be arranged.

Figure 2:
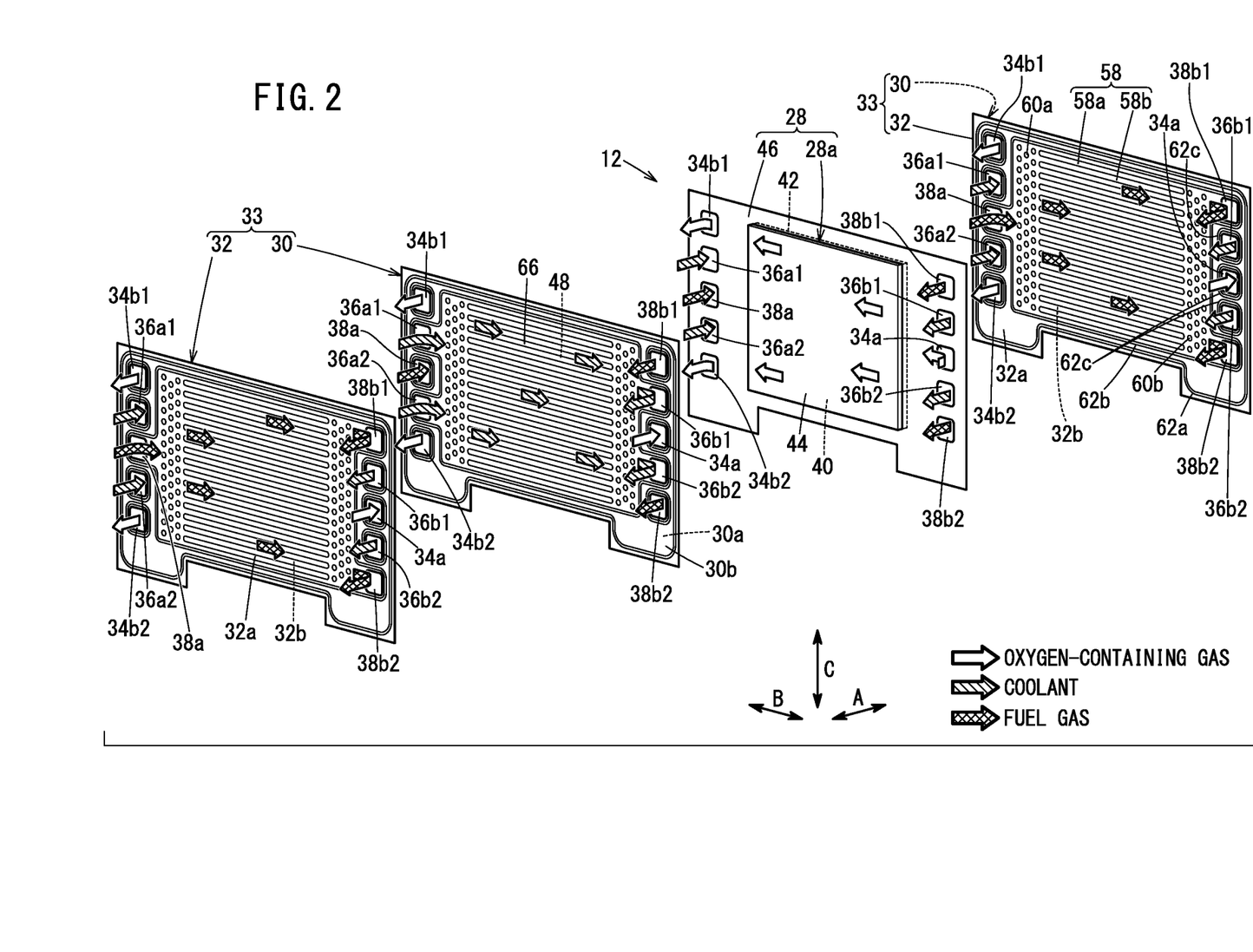
FIG. 2 is an exploded perspective view of a power generation cell.

Each of the terminal plates 16a, 16b is a current collector. An anode 42 (or a cathode 44) of each power generation cell 12 is electrically connected to the terminal plate 16a. On the other hand, the cathode 44 (or the anode 42) of each power generation cell 12 is electrically connected to the terminal plate 16b. The anode 42 and the cathode 44 are shown in FIG. 2.

In FIG. 1, terminal portions 22a and 22b are formed outward in the stacking direction at substantially the centers of the terminal plates 16a and 16b, respectively. Each of the terminal portions 22a and 22b has a substantially columnar shape. Most of side walls of the terminal portions 22a and 22b are covered with first and second insulating cylinders (not shown), respectively. A through hole 24 is formed in each of the first insulating plate 17, the second insulating plate 18, the insulating plate 19, and the end plates 20a and 20b. The first insulating cylinder is interposed between the terminal portion 22a and an inner wall of the through hole 24 formed in the first insulating plate 17, the second insulating plate 18, and the end plate 20a. In particular, the first insulating cylinder provides electrical insulation between the terminal portion 22a and the end plate 20a. The second insulating cylinder is interposed between the terminal portion 22b and an inner wall of the through hole 24 in the insulating plate 19 and the end plate 20b. In particular, the second insulating cylinder provides electrical insulation between the terminal portion 22b and the end plate 22b. Distal ends of the terminal portions 22a and 22b that are not covered with the first and second insulating cylinders are exposed to the outside of the end plates 20a and 20b in the stacking direction.

Each of the first insulating plate 17, the second insulating plate 18, and the insulating plate 19 is made of insulating material. The first insulating plate 17 is formed with a recess 26a that is depressed outward in the stacking direction (one side in the arrow A direction). The terminal plate 16a is accommodated in the recess 26a. The insulating plate 19 is formed with a recess 26b that is depressed outward in the stacking direction (the other side in the arrow A direction). The terminal plate 16b is accommodated in the recess 26b.

Each of the first insulating plate 17, the second insulating plate 18, and the insulating plate 19 is formed of an electrically insulating resin such as a polycarbonate (PC) resin or a phenol resin.

The end plates 20a and 20b each have a rectangular shape elongated in a lateral direction (or elongated in a vertical direction). Connecting bars 27 are disposed respectively between the sides of the end plate 20a and the sides of the end plate 20b. Both ends of each connecting bar 27 are fixed to the inner surfaces of the end plates 20a and 20b. A tightening load in the stacking direction (the arrow A direction) is applied to the cell stack body 14. Instead of this configuration, the cell stack body 14 may be accommodated in a housing having the end plates 20a and 20b as end plates.

In the power generation cell 12, as shown in FIG. 2, the resin framed MEA 28 is sandwiched between a first metal separator 30 and a second metal separator 32. Each of the first metal separator 30 and the second metal separator 32 is formed, for example, by press-forming a steel plate, a stainless steel plate, an aluminum plate, or a plated steel plate so as to have a corrugated cross-section. The first metal separator 30 and the second metal separator 32 are formed by press-forming metal thin plates subjected to anti-corrosion surface treatment so as to have a corrugated cross section. The outer peripheries of the first metal separator 30 and the second metal separator 32 are integrally joined by welding, brazing, caulking, or the like. Thus, a joint separator 33 is formed.

The resin framed MEA 28 includes a membrane electrode assembly 28a (hereinafter referred to as "MEA 28a") and a resin frame member 46 joined to the entire outer peripheral portion of the MEA 28a. The MEA 28a includes an electrolytic membrane 40, the anode 42 provided on one surface of the electrolytic membrane 40, and the cathode 44 provided on the other surface of the electrolytic membrane 40.

The electrolyte membrane 40 is made of, for example, a solid polymer electrolyte membrane (cation exchange membrane). The solid polymer electrolyte membrane is formed by impregnating a thin membrane of perfluorosulfonic acid with water, for example. The electrolyte membrane 40 is sandwiched between the anode 42 and the cathode 44. As the electrolyte membrane 40, an HC (hydrocarbon)-based electrolyte can be used in addition to a fluorine-based electrolyte.

Though not shown in detail, the anode 42 includes a first electrode catalyst layer joined to one surface of the electrolyte membrane 40, and a first gas diffusion layer stacked on the first electrode catalyst layer. The cathode 44 has a second electrode catalyst layer joined to the other surface of the electrolyte membrane 40, and a second gas diffusion layer stacked on the second electrode catalyst layer.

An upper fuel gas discharge passage 38b1 (upper reaction gas discharge passage), an upper coolant discharge passage 36b1, an oxygen-containing gas supply passage 34a (reaction gas supply passage), a lower coolant discharge passage 36b2, and a lower fuel gas discharge passage 38b2 (lower reaction gas discharge passage) are provided at one end of the power generation cell 12 in the direction indicated by the arrow B. These passages extend through the power generation cells 12 in the direction of the arrow A. These passages are aligned in the arrow C direction which is the vertical direction. These passages may be arranged in a so-called zigzag manner.

The fuel gas (for example, a hydrogen-containing gas), which is one of the reaction gases, is discharged from a fuel gas flow field 58 described later and flows through the upper fuel gas discharge passage 38b1 and the lower fuel gas discharge passage 38b2. An oxygen-containing gas, which is the other of the reaction gases, flows through the oxygen-containing gas supply passage 34a and is supplied to an oxygen-containing gas flow field 48 described later. The coolant is discharged appropriately from a coolant flow field 66 described later and flows through the upper coolant discharge passage 36b1 and the lower coolant discharge passage 36b2. The coolant is, for example, water, oil or ethylene glycol.

The oxygen-containing gas supply passage 34a is disposed between the upper coolant discharge passage 36b1 and the lower coolant discharge passage 36b2. The upper fuel gas discharge passage 38b1 is disposed above the upper coolant discharge passage 36b1. The lower fuel gas discharge passage 38b2 is disposed below the lower coolant discharge passage 36b2.

An upper oxygen-containing gas discharge passage 34b1 (upper reaction gas discharge passage), an upper coolant supply passage 36a1, a fuel gas supply passage 38a (reaction gas supply passage), a lower coolant supply passage 36a2, and a lower oxygen-containing gas discharge passage 34b2 (lower reaction gas discharge passage) are provided at the other end of the power generation cell 12 in the direction indicated by the arrow B. These passages extend through the power generation cells 12 in the direction of the arrow A. These passages are aligned in the arrow C direction, which is the vertical direction. These passages may be arranged in a so-called zigzag manner.

The fuel gas is supplied to the fuel gas flow field 58 through the fuel gas supply passage 38a. The coolant is supplied to the coolant flow field 66 through the upper coolant supply passage 36a1 and the lower coolant supply passage 36a2. The oxygen-containing gas is discharged from the oxygen-containing gas flow field 48 to the upper oxygen-containing gas discharge passage 34b1 and the lower oxygen-containing gas discharge passage 34b2.

The fuel gas supply passage 38a is disposed between the upper coolant supply passage 36a1 and the lower coolant supply passage 36a2, which are spaced apart from each other in the vertical direction. The upper oxygen-containing gas discharge passage 34b1 is located above the upper coolant supply passage 36a1. The lower oxygen-containing gas discharge passage 34b2 is located below the lower coolant supply passage 36a2.

The oxygen-containing gas supply passage 34a is arranged at one end on one side of the power generation cell 12 and the pair of the upper oxygen-containing gas discharge passage 34b1 and the lower oxygen-containing gas discharge passage 34b2 are arranged at the other end on the opposite side of the power generation cell 12 with the respect to the center of the power generation cell 12 in the horizontal direction indicated by the arrow B. The upper oxygen-containing gas discharge passage 34b1 is located at a position higher than the oxygen-containing gas supply passage 34a. The lower oxygen-containing gas discharge passage 34b2 is located at a position lower than the oxygen-containing gas supply passage 34a.

The fuel gas supply passage 38a is arranged at one end on one side of the power generation cell 12, and the pair of the lower fuel gas discharge passage 38b2 and the upper fuel gas discharge passage 38b1 are arranged at the other end on the opposite side of the power generation cell 12 with respect to the center of the power generation cell 12 in the direction indicated by the arrow B. The upper fuel gas discharge passage 38b1 is located at a position higher than the fuel gas supply passage 38a. The lower fuel gas discharge passage 38b2 is located at a position lower than the fuel gas supply passage 38a.

Figure 3:
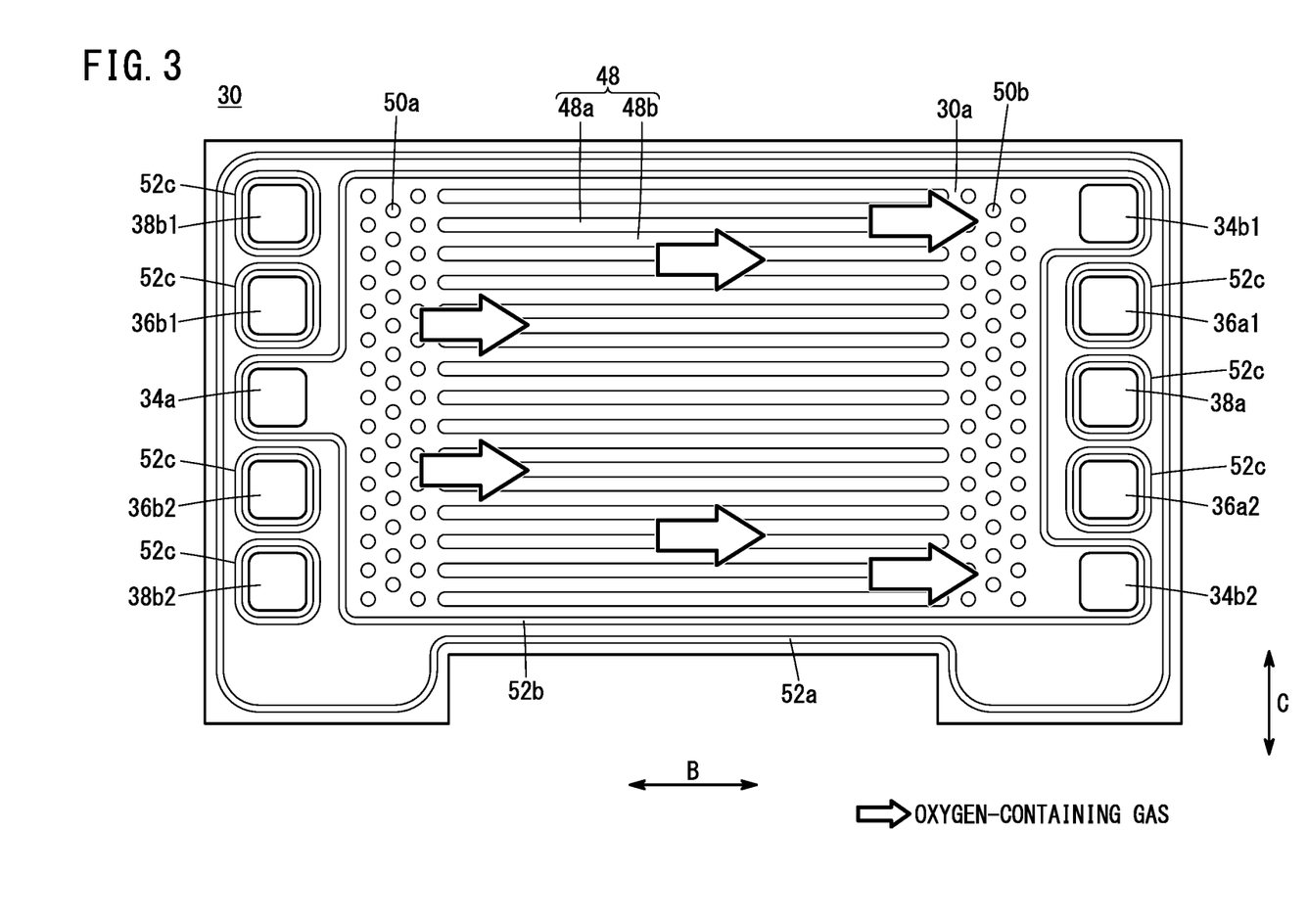
FIG. 3 is a diagram illustrating structure of a first metal separator as viewed from an oxygen-containing gas flow field side.

As shown in FIG. 3, the first metal separator 30 has a front surface 30a facing the resin framed MEA 28. For example, the oxygen-containing gas flow field 48 extends in the direction indicated by the arrow B on the front surface 30a. The oxygen-containing gas flow field 48 communicates with the oxygen-containing gas supply passage 34a, the upper oxygen-containing gas discharge passage 34b1, and the lower oxygen-containing gas discharge passage 34b2. The oxygen-containing gas flow field 48 has a plurality of linear flow grooves (or wavy flow grooves) 48b. The plurality of linear flow grooves (or wavy flow grooves) 48b are formed between a plurality of ridges 48a extending in the arrow B direction.

An inlet buffer 50a is formed by press molding between the oxygen-containing gas supply passage 34a and the oxygen-containing gas flow field 48. The inlet buffer 50a has a plurality of bosses protruding toward the MEA 28. An outlet buffer 50b is formed by press molding between the oxygen-containing gas flow field 48 and the pair of the upper oxygen-containing gas discharge passage 34b2 and the lower oxygen-containing gas discharge passage 34b1. The outlet buffer 50b has a plurality of bosses protruding toward the MEA 28.

A plurality of metal bead seals are formed by press forming provided on the front surface 30a of the first metal separator 30. The metal bead seal protrudes toward the resin framed MEA 28. Instead of the metal bead seal, a convex elastic seal made of elastic material may be provided. The plurality of metal bead seals include an outer bead 52a, an inner bead 52b, and a plurality of passage beads 52c. The outer bead 52a extends around the entire outer peripheral portion of the front surface 30a. The inner bead 52b surrounds the oxygen-containing gas flow field 48, the oxygen-containing gas supply passage 34a, the upper oxygen-containing gas discharge passage 34b1, and the lower oxygen-containing gas discharge passage 34b2, and allows fluid communication therebetween inside the inner bead 52b.

The plurality of passage beads 52c surround the fuel gas supply passage 38a, the upper fuel gas discharge passage 38b1, the lower fuel gas discharge passage 38b2, the upper coolant supply passage 36a1, the lower coolant supply passage 36a2, the upper coolant discharge passage 36b1, and the lower coolant discharge passage 36b2, respectively. The outer bead 52a may be provided as necessary, or may be omitted.

As shown in FIG. 2, the second metal separator 32 has a front surface 32a facing the resin framed MEA 28. For example, the fuel gas flow field 58 extending in the direction of the arrow B is formed in the front surface 32a. The fuel gas flow field 58 communicates with the fuel gas supply passage 38a, the upper fuel gas discharge passage 38b1, and the lower fuel gas discharge passage 38b2. The fuel gas flow field 58 has a plurality of linear flow grooves (or wavy flow grooves) 58b. The plurality of linear flow grooves (or wavy flow grooves) 58b are formed between the plurality of ridges 58a extending in the arrow B direction.

An inlet buffer 60a is formed by press forming between the fuel gas supply passage 38a and the fuel gas flow field 58. The inlet buffer 60a has a plurality of bosses protruding toward the MEA 28. An outlet buffer 60b is formed by press forming between the fuel gas flow field 58 and a set of the upper fuel gas discharge passage 38b2 and the lower fuel gas discharge passage 38b1. The outlet buffer 60b has a plurality of bosses protruding toward the MEA 28.

A plurality of metal bead seals are formed by press forming on the front surface 32a of the second metal separator 32. The metal bead seal protrudes toward the resin framed MEA 28. Instead of the metal bead seal, a convex elastic seal made of an elastic material may be provided. A plurality of metal bead seals include an outer bead 62a, an inner bead 62b, and a plurality of passage beads 62c. The outer bead 62a extends around the entire outer peripheral portion of the front surface 32a. The outer bead 62a surrounds the inner bead 62b. The inner bead 62b surrounds the fuel gas flow field 58, the fuel gas supply passage 38a, the upper fuel gas discharge passage 38b1, and the lower fuel gas discharge passage 38b2 and allows fluid communication therebetween inside the inner bead 62b.

The passage beads 62c surround the oxygen-containing gas supply passage 34a, the upper oxygen-containing gas discharge passage 34b1, the lower oxygen-containing gas discharge passage 34b2, the upper coolant supply passage 36a1, the lower coolant supply passage 36a2, the upper coolant discharge passage 36b1, and the lower coolant discharge passage 36b2, respectively. The outer bead 62a may be provided as necessary, or may be omitted.

The back surface 30b of the first metal separator 30 and the back surface 32b of the second metal separator 32 are joined to each other by welding or brazing. The coolant flow field 66 is formed between the back surface 30b of the first metal separator 30 and the back surface 32b of the second metal separator 32. The coolant flow field 66 communicates with the upper coolant supply passage 36a1, the lower coolant supply passage 36a2, the upper coolant discharge passage 36b1, and the lower coolant discharge passage 36b2.

Similarly to the power generation cells 12, the upper fuel gas discharge passage 38b1, the upper coolant discharge passage 36b1, the oxygen-containing gas supply passage 34a, the lower coolant discharge passage 36b2, and the lower fuel gas discharge passage 38b2 are provided at one end in the direction indicated by the arrow B of each of the end plates 20a, the first insulating plate 17, and the second insulating plate 18 of the fuel cell stack 10 shown in FIG. 1. The upper oxygen-containing gas discharge passage 34b1, the upper coolant supply passage 36a1, the fuel gas supply passage 38a, the lower coolant supply passage 36a2, and the lower oxygen-containing gas discharge passage 34b2 are also provided at the other end in the direction indicated by the arrow B of each of the end plate 20a, the first insulating plate 17, and the second insulating plate 18.

As shown in FIG. 1, the terminal plate 16a is positioned between a set of five passages provided on one side and a set of five passages provided on the other side in the direction of arrow B. The dimension of the terminal plate 16a in the direction indicated by the arrow B may be increased, and the ten passages may be provided in the terminal plate 16a.

Figure 4:
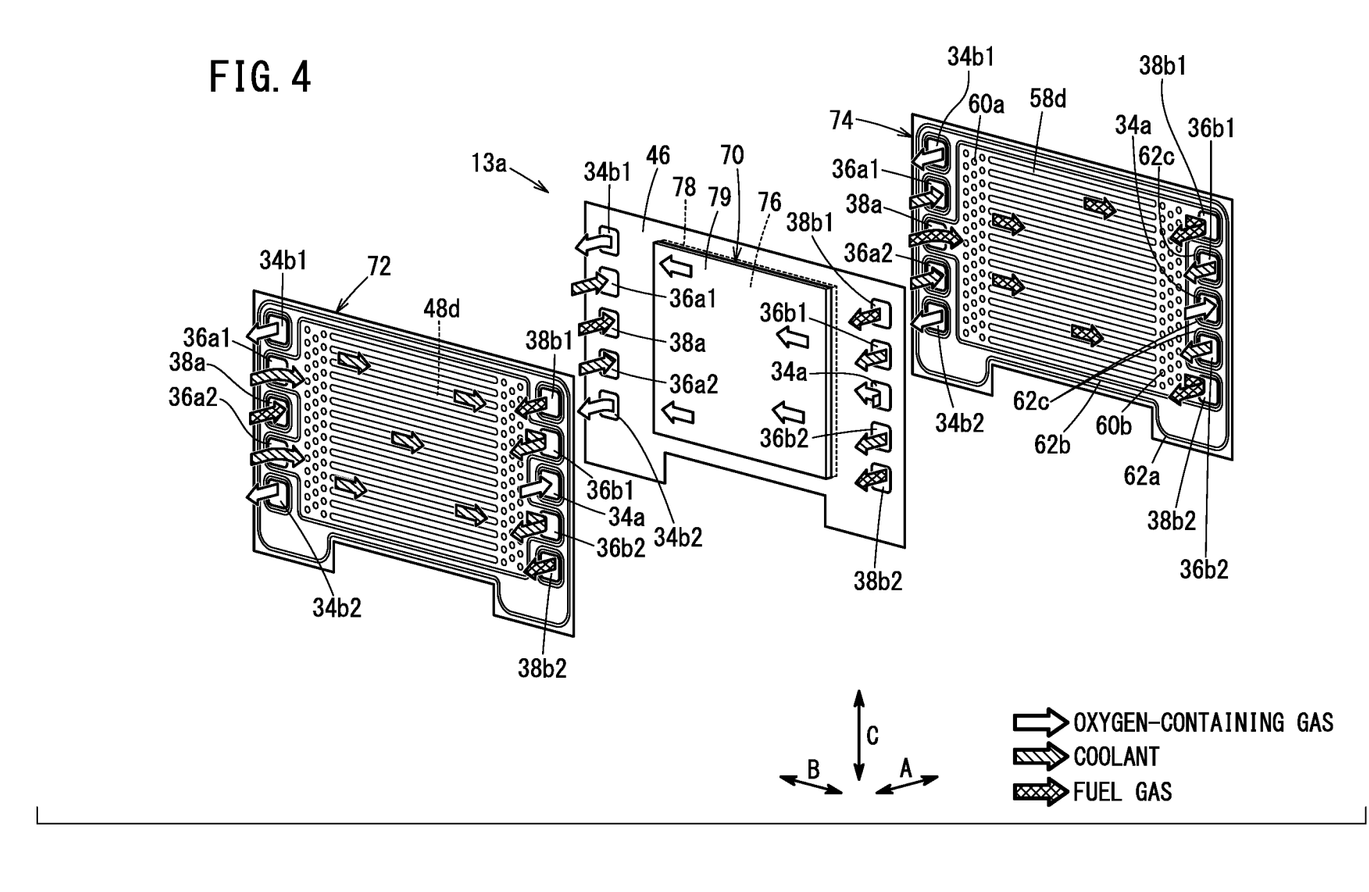
FIG. 4 is an exploded perspective view of a dummy cell.

As shown in FIG. 4, a dummy cell 13a includes a dummy electrode assembly 70, the resin frame member 46, a first dummy separator 72, and a second dummy separator 74. The dummy electrode assembly 70 is used in place of the MEA 28a (see FIG. 2) and does not have a power generation function. The resin frame member 46 is bonded to the outer peripheral portion of the dummy electrode assembly 70. The first dummy separator 72 and the second dummy separator 74 sandwich the dummy electrode assembly 70. The dummy electrode assembly 70 includes an electrically conductive plate 76 used in place of the electrolyte membrane 40 (see FIG. 2), and a pair of electrodes 78 and 79 bonded to both surfaces of the plate 76, respectively. That is, unlike the MEA 28a, the dummy electrode assembly 70 does not include the electrolyte membrane 40.

The plate 76 corresponds to the electrolyte membrane 40 of the power generation cell 12 (see FIG. 2), and is formed in the same shape as the electrolyte membrane 40. The plate 76 is, for example, a metal plate made of stainless steel. The plate 76 may be a carbon plate.

One electrode 78 corresponds to the gas diffusion layer of the anode 42 (see FIG. 2), and is made of, for example, carbon paper. The other electrode 79 corresponds to the gas diffusion layer of the cathode 44 (see FIG. 2), and is made of, for example, carbon paper. Each of the electrodes 78, 79 does not have an electrode catalyst layer.

Since the first dummy separator 72 is configured substantially similarly to the first metal separator 30, a detailed description thereof will be omitted. Since the second dummy separator 74 has substantially the same configuration as the second metal separator 32, a detailed description thereof will be omitted. In the first dummy separator 72 and the second dummy separator 74, the same constituent elements as those of the first metal separator 30 and the second metal separator 32 are denoted by the same reference numerals.

A first flow field 48d is formed inside the dummy cell 13a. The first flow field 48d is a flow field corresponding to the oxygen-containing gas flow field 48 of the power generation cell 12. The first flow field 48d is formed between the dummy electrode assembly 70 and the first dummy separator 72. The first flow field 48d communicates with the oxygen-containing gas supply passage 34a and communicates with the upper oxygen-containing gas discharge passage 34b1 and the lower oxygen-containing gas discharge passage 34b2. A second flow field 58d is formed inside the dummy cell 13a. The second flow field 58d is a flow field corresponding to the fuel gas flow field 58 of the power generation cell 12. The second flow field 58d is formed between the dummy electrode assembly 70 and the second dummy separator 74. The second flow field 58d communicates with the fuel gas supply passage 38a and communicates with the upper fuel gas discharge passage 38b1 and the lower fuel gas discharge passage 38b2.

In FIG. 1, the other dummy cell 13b disposed on the other end of the cell stack body 14 is configured similarly to the dummy cell 13a disposed on the one end of the cell stack body 14.

Figure 5:
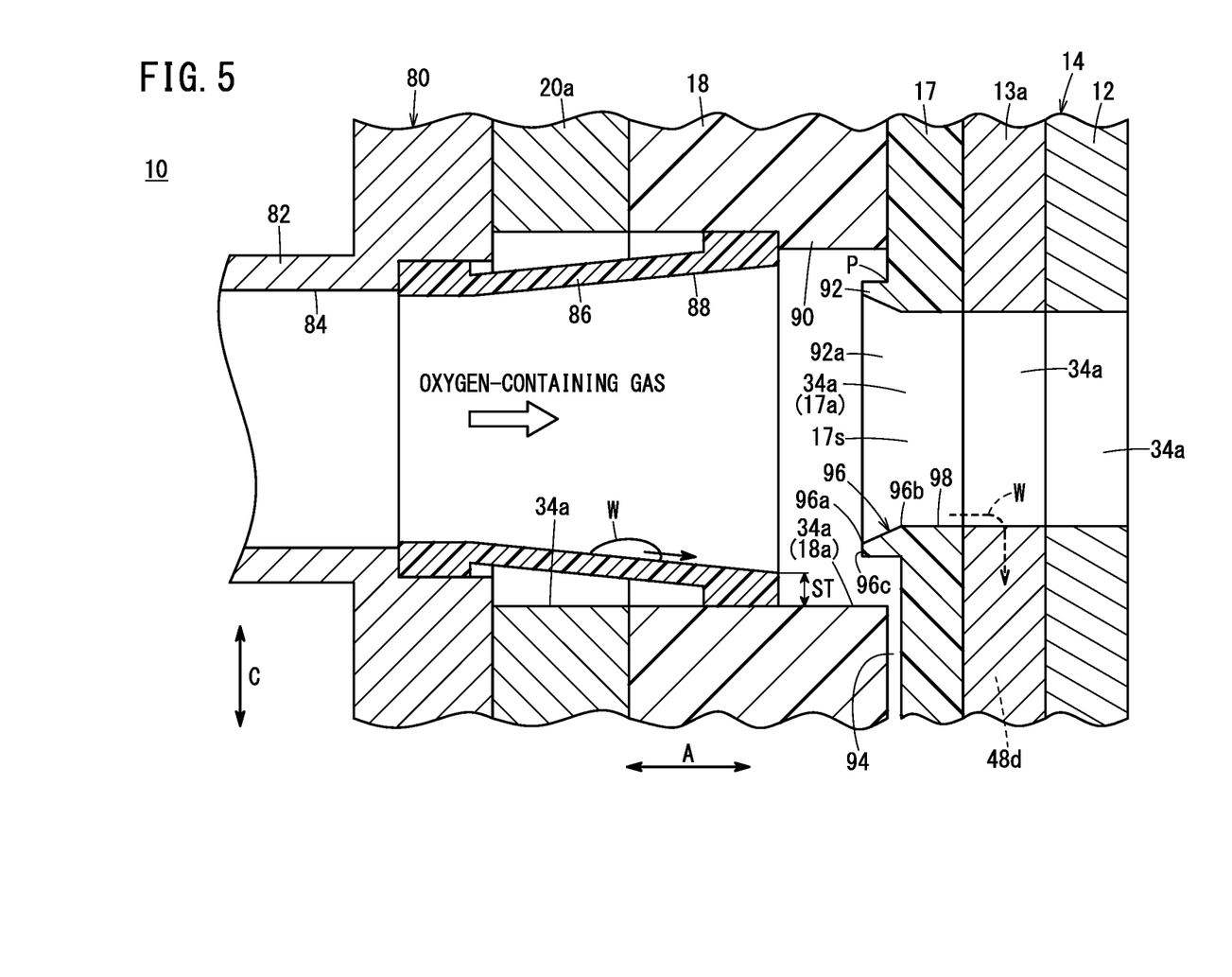
FIG. 5 is a schematic cross-sectional view taken along the stacking direction (direction of the arrow A) in the vicinity of an oxygen-containing gas supply passage.

A manifold 80 (reaction gas supply piping member) shown in FIG. 5 is attached to the end plate 20a. FIG. 5 shows an oxygen-containing gas supply pipe 82. The inside of the oxygen-containing gas supply pipe 82 is an oxygen-containing gas supply channel 84.

An outlet end portion of the oxygen-containing gas supply pipe 82 is aligned with the oxygen-containing gas supply passage 34a in the end plate 20a. Thus, the oxygen-containing gas supply channel 84 communicates with the oxygen-containing gas supply passage 34a. The oxygen-containing gas supply passage 34a may have a cylindrical shape.

An intermediate joint 86 is fitted to the outlet end portion of the oxygen-containing gas supply pipe 82. The intermediate joint 86 has a substantially hollow circular truncated conical shape. Both ends of the intermediate joint 86 are open. The intermediate joint 86 expands from the manifold 80 toward the second insulating plate 18. Therefore, the inner diameter of a through hole 88 formed inside the intermediate joint 86 gradually increases from the manifold 80 toward the second insulating plate 18.

An arc-shaped stopper 90 is formed inside the oxygen-containing gas supply passage 34a of the second insulating plate 18 (hereinafter also referred to as "second plate passage 18a"). The stopper 90 protrudes inward of the second plate passage 18a. A distal end surface at one end of the expanded intermediate joint 86 abuts against the stopper 90. As a result, the intermediate joint 86 is inserted halfway into the second plate passage 18a and stopped by the stopper 90. A step ST corresponding to the thickness of the intermediate joint 86 at the one end is created between the intermediate joint 86 and the inner wall of the second plate passage 18a where the stopper 90 is not formed.

In the vicinity of an inlet of the oxygen-containing gas supply passage 34a of the first insulating plate 17 (hereinafter also referred to as a "first plate passage 17a"), an annular protrusion 92 is formed to protrude toward the second insulating plate 18. The sizes of the annular protrusion 92 in the vertical direction (C direction) and in the lateral direction (A direction) are smaller than the sizes of the second plate passage 18a of the second insulating plate 18 in the vertical direction and the lateral direction, respectively. A distal end of the annular protrusion 92 enters the second plate passage 18a. In the case where the second plate passage 18a is circular, the outer diameter of the annular protrusion 92 may be made smaller than the inner diameter of the second plate passage 18a.

An internal space 92a of the annular protrusion 92 (a space surrounded by the annular protrusion 92) defines a part of the first plate passage 17a. To be specific, the internal space 92a of the annular protrusion 92 constitutes an upstream part of the first plate passage 17a.

A lower portion of the inner surface 17s forming the first plate passage 17a has an inclined section 96 that is inclined upward toward the downstream of the oxygen-containing gas (rightward in FIG. 5). The inclined section 96 has a first end 96a (upstream end), which is an end of the annular protrusion 92 in the protruding direction, and a second end 96b (downstream end), which is an end in a direction opposite to the protruding direction. The inclined section 96 starts inclining from the first end 96a up to the second end 96b. The inclined section 96 is inclined with respect to the horizontal direction such that the second end 96b is positioned higher than the first end 96a. The inclination angle of the inclined section 96 is not particularly limited as long as it is in a range larger than 0 degrees and smaller than 90 degrees. The inclination angle of the inclined section 96 may be set in a range of 10 degrees to 80 degrees. Alternatively, the inclination angle of the inclined section 96 may be set in a range of 20 degrees to 70 degrees.

The inclined section 96 may include a plurality of inclined sections having different inclination angles. Accordingly, the inclined section 96 may include, for example, a first inclined section and a second inclined section provided downstream of the first inclined section. The inclination angle of the second inclined section may be larger than the inclination angle of the first inclined section.

The inclined section 96 is provided in an upstream part of the first plate passage 17a. The inclined section 96 includes the lowest part of the inner surface of the first plate passage 17a at the protruding end 96c of the annular protrusion 92. In FIG. 5, the second end 96b of the inclined section 96 is positioned downstream (power generation cell 12 side) of the root position P of the annular protrusion 92 (protrusion starting point from the end surface of the first insulating plate 17). The second end 96b of the inclined section 96 may be positioned in alignment with the root position P of the annular protrusion 92 in the flow direction of the oxygen-containing gas (the thicknesswise direction of the first insulating plate 17) (the direction indicated by the arrow A). The second end 96b may be positioned upstream of the root position P.

On the downstream side of the inclined section 96, the first plate passage 17a includes a simple section 98 having no inclination toward the dummy cell 13a. The simple section 98 is provided at the lower portion of the first plate passage 17a. The simple section 98 extends parallel to the thickness direction (the arrow A direction) of the first insulating plate 17.

A bypass channel 94 is formed between the first insulating plate 17 and the second insulating plate 18. The bypass channel 94 connects the second plate passage 18a and the lower oxygen-containing gas discharge passage 34b2 (see FIG. 2). An inlet of the bypass channel 94 is formed between the annular protrusion 92 (specifically, a lower portion of the annular protrusion 92) and the second insulating plate 18. The inlet of the bypass channel 94 is positioned below the annular protrusion 92. The bypass channel 94 extends as clearance formed between the first insulating plate 17 and the second insulating plate 18. The bypass channel 94 is formed in a groove shape on a surface of the first insulating plate 17 facing the second insulating plate 18.

Figure 6:
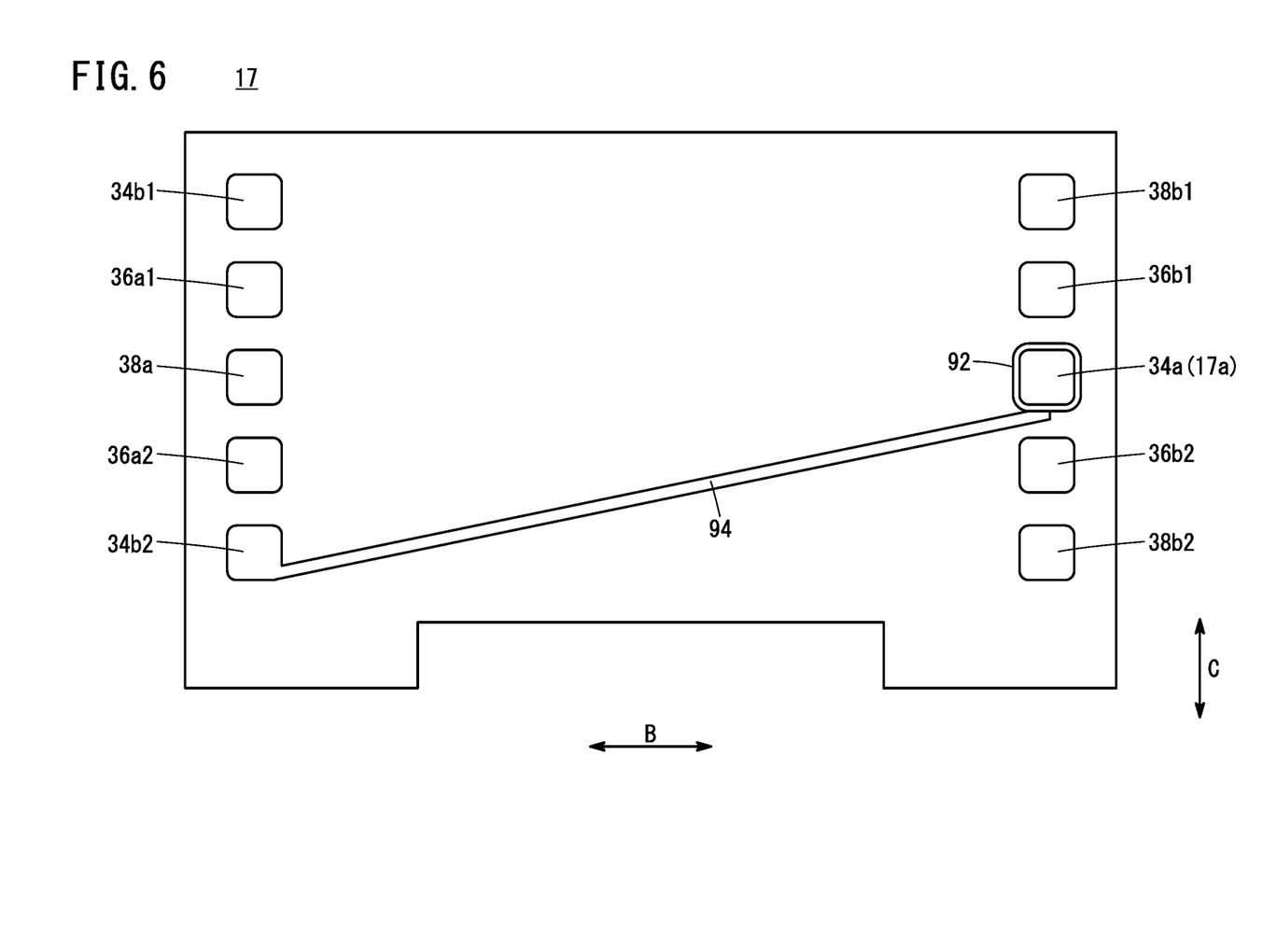
FIG. 6 is a schematic front view showing a surface of the first insulating plate facing the second insulating plate.

As shown in FIG. 6, the groove-shaped bypass channel 94 extends from the lower portion of the oxygen-containing gas supply passage 34a (first plate passage 17a) toward the side portion of the lower oxygen-containing gas discharge passage 34b2. A seal member (not shown) is provided around the bypass channel 94.

The oxygen-containing gas supply passage 34a is positioned higher than the lower oxygen-containing gas discharge passage 34b2. For this reason, the bypass channel 94 is inclined from the oxygen-containing gas supply passage 34a toward the lower oxygen-containing gas discharge passage 34b2 with respect to the direction indicated by the arrow B.

The fuel cell stack 10 configured as described above operates as follows.

In the operation of the fuel cell stack 10, as shown in FIG. 1, the oxygen-containing gas (e.g., compressed air) is supplied to the oxygen-containing gas supply passage 34a in the end plate 20a. The fuel gas such as a hydrogen-containing gas is supplied to the fuel gas supply passage 38a in the end plate 20a. The coolant such as pure water, ethylene glycol, or oil is supplied to the upper coolant supply passage 36a1 and the lower coolant supply passage 36a2 of the end plate 20a.

As shown in FIG. 2, the fuel gas is introduced into the fuel gas flow field 58 of the second metal separator 32 from the fuel gas supply passage 38a. The fuel gas moves in the direction of the arrow B along the fuel gas flow field 58 and is supplied to the anode 42 of the MEA 28a.

As shown in FIG. 3, the oxygen-containing gas is introduced into the oxygen-containing gas flow field 48 of the first metal separator 30 from the oxygen-containing gas supply passage 34a. The oxygen-containing gas flows in the direction indicated by the arrow B along the oxygen-containing gas flow field 48 and is supplied to the cathode 44 of the MEA 28a.

Therefore, in each MEA 28a shown in FIG. 2, the fuel gas and the oxygen-containing gas are consumed by electrochemical reactions in the first electrode catalyst layer and the second electrode catalyst layer to generate electricity. Further, the coolant is introduced into the coolant flow field 66 formed between the first metal separator 30 and the second metal separator 32 and then flows in the direction of the arrow B. After cooling the MEA 28a, the coolant is discharged from the upper coolant discharge passage 36b1 and the lower coolant discharge passage 36b2.

After being supplied to the anode 42, the remainder of the fuel gas is distributed to the upper fuel gas discharge passage 38b1 and the lower fuel gas discharge passage 38b2. The remainder of the fuel gas flows through the upper fuel gas discharge passage 38b1 and the lower fuel gas discharge passage 38b2 in the direction indicated by the arrow A and is discharged from the fuel-cell stack 10. After being supplied to the cathode 44, the remainder of the oxygen-containing gas is distributed to the upper oxygen-containing gas discharge passage 34b1 and the lower oxygen-containing gas discharge passage 34b2. The remainder of the oxygen-containing gas flows through the upper oxygen-containing gas discharge passage 34b1 and the lower oxygen-containing gas discharge passage 34b2 in the direction indicated by the arrow A and is discharged from the fuel-cell stack 10.

Before the oxygen-containing gas is supplied to the fuel cell stack 10, the oxygen-containing gas is humidified by adding water to the oxygen-containing gas, in order to keep the electrolyte membrane 40 in a moisturized condition. For example, when operation of the fuel cell stack 10 is stopped and the temperature becomes low, the water is condensed in the oxygen-containing gas supply pipe 82 of the manifold 80 shown in FIG. 5. As a result, it is assumed that dew condensation water W is produced.

In the fuel cell stack 10, the through hole 88 of the intermediate joint 86 communicates with the oxygen-containing gas supply channel 84 in the oxygen-containing gas supply pipe 82. The inner diameter of the through hole 88 increases toward the oxygen-containing gas supply passage 34a (second plate passage 18a) of the second insulating plate 18. In other words, the inner diameter of the through hole 88 increases toward the downstream side in the flow direction of the oxygen-containing gas. Therefore, when dew condensation water W is produced, the dew condensation water W easily flows to the second insulating plate 18 along the inner wall of the through hole 88.

Between the intermediate joint 86 and the inner wall of the oxygen-containing gas supply passage 34a of the second insulating plate 18 (the second plate passage 18a), there is formed a step ST corresponding to the thickness of the intermediate joint 86. The gravity acts on the dew condensation water W that has reached the outlet end (downstream opening) of the through hole 88. That is, the dew condensation water W easily drops on the inner wall of the second plate passage 18a due to the gravity.

An annular protrusion 92 is provided near the oxygen-containing gas supply passage 34a of the first insulating plate 17 (first plate passage 17a). The sizes of the annular protrusion 92 in the longitudinal direction and the lateral direction are smaller than the sizes of the oxygen-containing gas supply passage 34a of the second insulating plate 18 in the longitudinal direction and the lateral direction, respectively. In order for the dew condensation water W dropped on the inner wall of the second plate passage 18a to enter the first plate passage 17a, it is necessary for the dew condensation water W to raise the annular protrusion 92 against the gravity. Because it is unlikely that the dew condensation water W goes up to the annular protrusion 92 regardless of the level difference, the dew condensation water W dropped on the inner wall of the second plate passage 18a is prevented from reaching the downstream side of the second plate passage 18a (the first plate passage 17a).

The dew condensation water W dripped on the inner wall of the second plate passage 18a rather flows into the bypass channel 94, and then flows to the lower oxygen-containing gas discharge passage 34b2 through the bypass passage 94 (see FIG. 6). Thereafter, the dew condensation water W is discharged to the outside from the end plate 20a (see FIG. 1).

The fuel cell stack 10 has the following effects.

As described above, the internal space 92a of the annular protrusion 92 constitutes a part of the first plate passage 17a. The lower portion of the inner surface forming the first plate passage 17a has the inclined section 96 that is inclined upward toward the downstream side in the flow direction of the oxygen-containing gas. With this configuration, even when the dew condensation water W goes up to the annular protrusion 92, the dew condensation water W is returned to the second plate passage 18a by the inclination of the inclined section 96 and the gravity, and flows to the bypass channel 94. Therefore, the intrusion of liquid water such as the dew condensation water W into the power generation cell 12 can be more effectively suppressed. Therefore, it is possible to prevent the oxygen-containing gas flow field 48 in the cell stack body 14 from being clogged and causing shortage of the oxygen-containing gas supplied to the power generation cells 12.

As a result, it is possible to effectively prevent a decrease in power generation performance due to an unstable cell voltage or a decrease in cell voltage. In addition, deterioration of the electrolyte membrane and the electrode catalyst and corrosion of the separator due to water retained in the cell stack body 14 are prevented. Therefore, there is an advantage that the life of the fuel cell stack 10 is prolonged.

The inclined section 96 is provided in the upstream part of the first plate passage 17a. With this configuration, since the inclined section 96 is close to the second plate passage 18a, the dew condensation water W that has entered the first plate passage 17a is easily returned to the second plate passage 18a.

The inclined section 96 is positioned at the lowest part at the protruding end 96c of the annular protrusion 92. With this configuration, the inclined section 96 extends from the protruding end 96c of the annular protrusion 92. Therefore, the dew condensation water W that has entered the first plate passage 17a can be further easily returned to the second plate passage 18a.

The dummy cell 13a having no power generation function is disposed between the cell stack body 14 and the first insulating plate 17. The dummy cell 13a internally includes the first flow field 48d (see FIG. 4) that communicates with the oxygen-containing gas supply passage 34a (reaction gas supply passage) and communicates with the upper oxygen-containing gas discharge passage 34b1 (upper reaction gas discharge passage) and the lower oxygen-containing gas discharge passage 34b2 (lower reaction gas discharge passage). Even if the dew condensation water W passes through the first plate passage 17a and enters the downstream side, the dew condensation water W is received by the first flow field 48d of the dummy cell 13a (see also FIG. 4). Thus, the dew condensation water W is prevented from entering the power generation cell 12 located downstream of the dummy cell 13a. The dew condensation water W flowing into the first flow field 48d of the dummy cell 13a is discharged from the lower oxygen-containing gas discharge passage 34b2 of the dummy cell 13a (see FIG. 4). As described above, since intrusion of the dew condensation water W from the first plate passage 17a toward the downstream side is suppressed in the first place, intrusion of the dew condensation water W into the dummy cell 13a is also suppressed. Therefore, the amount of the dew condensation water W reaching the dummy cell 13a is likely to fall within an allowable range that can be treated (accepted) by the dummy cell 13a within a unit time.

On the downstream side of the inclined section 96, the first plate passage 17a has the simple section 98 having no inclination toward the dummy cell 13a. With this configuration, as indicated by a broken line arrow in FIG. 5, the dew condensation water W moving to the dummy cell 13a side over the inclined section 96 can be easily dropped to the first flow field 48d of the dummy cell 13a. Therefore, intrusion of the dew condensation water W into the power generation cell 12 can be more suitably suppressed.

The present invention is not limited to the above-described embodiments, and various modifications can be made without departing from the scope of the present invention. For example, there may be no step ST corresponding to the thickness of the intermediate joint 86. The inner wall of the second plate passage 18a and the distal end of the inclined section 96 (the first end 96a) may be level with each other.

For example, the bypass channel 94 may be provided from the fuel gas supply passage 38a to the lower fuel gas discharge passage 38b2.

The groove-shaped bypass channel 94 may be formed on a surface of the second insulating plate 18 facing the first insulating plate 17.

Both the bypass channel 94 extending from the oxygen-containing gas supply passage 34a to the lower oxygen-containing gas discharge passage 34b2 and the bypass channel 94 extending from the fuel gas supply passage 38a to the lower fuel gas discharge passage 38b2 may be provided. In this case, one bypass passage 94 is formed in the first insulating plate 17, and the other bypass passage 94 is formed in the second insulating plate 18. In the case where both bypass channels 94 intersect one another, a lid portion may be provided at the intersecting point in order to avoid mixing of both reaction gases at the intersecting point.

The above embodiments can be summarized as follows.

The above embodiment discloses the fuel cell stack (10) including the cell stack body (14), and the terminal plate (16a), the first insulating plate (17), the second insulating plate (18) and the end plate (20a) which are disposed at the one end of the cell stack body, the cell stack body including the plurality of power generation cells (12) stacked one another, each of the power generation cells including the membrane electrode assembly (28a) and the separators with the membrane electrode assembly interposed between the separators, the membrane electrode assembly including the electrolyte membrane (40) with the anode (42) and the cathode (44) with the electrolyte membrane interposed between the anode and the cathode, wherein the first insulating plate is arranged between the cell stack body and the second insulating plate, the reactant gas supply passage for supplying the reactant gas to the anode or the cathode, the upper reactant gas discharge passage and the lower reactant discharge passage both for discharging the remainder of the reactant gas having been consumed at the anode or the cathode extend in the stacking direction through at least the cell stack body, the first insulating plate, the second insulating plate and the end plate, the reactant gas supply passage is disposed at the one end of the cell stack body in the horizontal direction, and the upper reactant gas discharge passage is disposed at the other end of the cell stack body in the horizontal direction at the position higher than the reactant gas supply passage, and the lower reactant gas discharge passage is disposed at the other end of the cell stack body in the horizontal direction at the position lower than the reactant gas supply passage, the reactant gas supply passage in the first insulating plate is the first plate passage (17a) and the reactant gas supply passage in the second insulating plate is the second plate passage (18a), the bypass channel (94) is formed between the first insulating plate and the second insulating plate and connects the second plate passage to the lower reactant gas discharge passage, the annular protrusion (92) protruding toward the second plate passage is disposed around the first plate passage, the annular protrusion forms the inlet of the bypass channel with the second insulating plate, the annular protrusion includes the internal space (92a) defining a part of the first plate passage, and the lower portion of the inner surface (17s) of the first plate passage comprises the inclined section (96) that is inclined upward toward the downstream of the reactant gas.

The inclined section is provided in the upstream part of the first plate passage.

The inclined section is provided at the lowest point of the inner surface at the protruding end (96c) of the annular protrusion.

The dummy cell (13a) having no power generation function is disposed between the cell stack body and the first insulating plate, and the flow field communicating with the reaction gas supply passage and communicating with the upper reaction gas discharge passage and the lower reaction gas discharge passage is formed inside the dummy cell.

On the downstream side of the inclined section, the first plate passage has the simple section (98) having no inclination toward the dummy cell.

What is claimed is:

1. A fuel cell stack comprising a cell stack body, and a terminal plate, a first insulating plate, a second insulating plate and an end plate which are disposed at one end of the cell stack body, the cell stack body comprising a plurality of power generation cells stacked one another, each of the power generation cells comprising a membrane electrode assembly and separators with the membrane electrode assembly interposed between the separators, the membrane electrode assembly comprising an electrolyte membrane with an anode and a cathode with the electrolyte membrane interposed between the anode and the cathode,
wherein the first insulating plate is arranged between the cell stack body and the second insulating plate,
a reactant gas supply passage for supplying a reactant gas to the anode or the cathode, an upper reactant gas discharge passage and a lower reactant discharge passage both for discharging a remainder of the reactant gas having been consumed at the anode or the cathode extend, in a stacking direction, through at least the cell stack body, the first insulating plate, the second insulating plate and the end plate,
the reactant gas supply passage is disposed at a first end of the cell stack body in a horizontal direction, and the upper reactant gas discharge passage is disposed at a second end of the cell stack body in the horizontal direction at a position higher than the reactant gas supply passage, and the lower reactant gas discharge passage is disposed at the second end of the cell stack body in the horizontal direction at a position lower than the reactant gas supply passage, the reactant gas supply passage in the first insulating plate is a first plate passage, and the reactant gas supply passage in the second insulating plate is a second plate passage, a bypass channel is formed between the first insulating plate and the second insulating plate and connects the second plate passage to the lower reactant gas discharge passage, an annular protrusion protruding toward the second plate passage is disposed around the first plate passage, and forms an inlet of the bypass channel with the second insulating plate, the annular protrusion includes an internal space defining a part of the first plate passage, a lower portion of an inner surface of the first plate passage comprises an inclined section that is inclined upward toward a downstream of the reactant gas, and the inclined section is provided in an upstream part of the first plate passage at a lowest point of the inner surface at a protruding end of the annular protrusion.

2. The fuel cell stack according to claim 1, wherein a dummy cell having no power generation function is disposed between the cell stack and the first insulating plate, and a flow field communicating with the reaction gas supply passage and communicating with the upper reaction gas discharge passage and the lower reaction gas discharge passage is formed inside the dummy cell.

3. The fuel cell stack according to claim 2, wherein on a downstream side of the inclined section, the first plate passage has a section having no inclination toward the dummy cell side.

4. A fuel cell stack comprising a cell stack body, and a terminal plate, a first insulating plate, a second insulating plate and an end plate which are disposed at one end of the cell stack body, the cell stack body comprising a plurality of power generation cells stacked one another, each of the power generation cells comprising a membrane electrode assembly and separators with the membrane electrode assembly interposed between the separators, the membrane electrode assembly comprising an electrolyte membrane with an anode and a cathode with the electrolyte membrane interposed between the anode and the cathode, wherein the first insulating plate is arranged between the cell stack body and the second insulating plate, a reactant gas supply passage for supplying a reactant gas to the anode or the cathode, an upper reactant gas discharge passage and a lower reactant discharge passage both for discharging a remainder of the reactant gas having been consumed at the anode or the cathode extend, in a stacking direction, through at least the cell stack body, the first insulating plate, the second insulating plate and the end plate, the reactant gas supply passage is disposed at a first end of the cell stack body in a horizontal direction, and the upper reactant gas discharge passage is disposed at a second end of the cell stack body in the horizontal direction at a position higher than the reactant gas supply passage, and the lower reactant gas discharge passage is disposed at the second end of the cell stack body in the horizontal direction at a position lower than the reactant gas supply passage, the reactant gas supply passage in the first insulating plate is a first plate passage, and the reactant gas supply passage in the second insulating plate is a second plate passage, a bypass channel is formed between the first insulating plate and the second insulating plate and connects the second plate passage to the lower reactant gas discharge passage, an annular protrusion protruding toward the second plate passage is disposed around the first plate passage, and forms an inlet of the bypass channel with the second insulating plate, the annular protrusion includes an internal space defining a part of the first plate passage, a lower portion of an inner surface of the first plate passage comprises: an inclined section that is provided in an upstream part of the first plate passage and inclined upward toward a downstream of the reactant gas; and a section having no inclination toward the cell stack body on a downstream side of the inclined section, and the inclined section is inclined downward toward an upstream of the reactant gas from an upstream end of the section having no inclination.

* * * * *